United States Patent [19]

Gueyne et al.

[11] 3,914,416

[45] Oct. 21, 1975

[54] CERTAIN MONOMETHYL TRISILANOL MANNURONATE COMPLEXES FOR TREATING CELLULITIS

[75] Inventors: Charles Henri Jean Gueyne, Cauderan; Marie Irene Duffaut nee Paumont, Barsac, both of France

[73] Assignee: Societe Anonyme Exsymol, Monaco

[22] Filed: May 1, 1970

[21] Appl. No.: 33,947

Related U.S. Application Data

[63] Continuation-in-part of Ser. No. 692,303, Dec. 21, 1967, abandoned.

[30] Foreign Application Priority Data

Dec. 23, 1966 France .............................. 66.88728

[52] U.S. Cl. ................................ 424/184; 424/180
[51] Int. Cl.² ....................................... A61K 31/695
[58] Field of Search .......... 424/184, 180; 260/448.2

[56] References Cited
FOREIGN PATENTS OR APPLICATIONS
1,234,213    5/1960    France

*Primary Examiner*—V. D. Turner
*Attorney, Agent, or Firm*—Irwin M. Aisenberg

[57] ABSTRACT

Salicylic acid and mannuronic acid complexes of alkali metal methylsilanolates can be prepared in stable aqueous compositions which are useful as therapeutics and cosmetics.

5 Claims, No Drawings

CERTAIN MONOMETHYL TRISILANOL MANNURONATE COMPLEXES FOR TREATING CELLULITIS

RELATED APPLICATIONS

This is a continuation-in-part of copending application Serial No. 692,303, filed Dec. 21, 1967 now abandoned.

BACKGROUND

When an alkaline siliconate solution is added, with vigorous agitation, to an aqueous acid solution, a relatively stable solution may be obtained at a pH from 2 to 6. The acid is, e.g., formic acid, acetic acid, sulfuric acid or hydrochloric acid. A solution having a pH from 2 to 6 may also be obtained by passing an alkaline siliconate solution over a cation exchange resin; the resulting solution, however, is stable for only a limited time.

The preceding methods are not capable of providing time-stable complex aqueous solutions.

British Pat. No. 955,969 is directed to the preparation of organo-silicon complexes in the form of stable solutions, but the complexes cannot be redissolved in water at a pH between 1 and 8 after having been precipitated from an aqueous solution at a pH outside of that range; such precipitations result in polymerization, the products of which are only redissolved in an alkali-metal hydroxide solution.

SUMMARY

Monomethyltrisilanol mannuronate and monomethyltrisilanol salicylate and their alkali metal salts form stable aqueous solutions at a pH between 1 and 8. After precipitating at a higher pH, these monomethyltrisilanol/acid complexes are readily redissolved in water to form stable aqueous solutions at a pH between 1 and 8.

In these complexes the trisilanol is of the formula

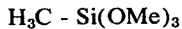

where each Me is, independently, either a hydrogen atom or an alkali metal atom, i.e. either sodium or potassium. The mannuronate and the salicylate are either in the free acid form or in the form of an alkali metal salt thereof, i.e. sodium or potassium mannuronate or salicylate.

Each complex is prepared by slowly adding (with thorough agitation) an aqueous alkali siliconate solution to the acid to be complexed and then adding thereto (while continuing agitation) sufficient cation exchange resin to produce a product having a pH between 1 and 8. A stable aqueous solution of the complex results.

An object of this invention is to obtain acid complexes of methylsilanolate which form stable aqueous solutions at a pH of from 1 to 8. A further object is to form such complexes as will still form stable aqueous solutions in this pH range after being precipitated at a higher pH. Another object is to procure a therapeutic which is effectively applied topically for the treatment of cellulitis. A still further object is to find a therapeutic which is useful for successfully treating severe chronic coronary deficiencies. Additional objects are apparent from the following details.

DETAILS

The exchange resin employed is any cation exchange resin, e.g. DOWEX 50 and AMBERLITE IRC50. DOWEX 50 is a polyacrylic resin with sulfonic acid ($-SO_3H$) functional groups and capable of decreasing pH to a pH of 1. AMBERLITE IRC50 is a polyacrylic resin with carboxylic acid ($-COOH$) functional groups and is incapable of decreasing the pH below a pH of 3.5 or 4. The only limitation on the cation exchange resin is that it must be capable of bringing the pH within the range of from 1 to 8. In addition to the added stability the cation exchange resin actually adjusts the pH to within the range in which the active ingredient is most effectively administered.

The essential ingredient is one of two products. One product (Algisium) is monomethyltrisilanol mannuronate or mannuronic acid methylsilanolate; the other (MSB) is monomethyltrisilanol salicylate or salicylic acid methylsilanolate. [Algisium and MSB are specific to complexes which form stable aqueous solutions over virtually the entire pH range of from 1 to 8, although not necessarily inclusive of the stated limits of the range.] Each is a complex of the general formula:

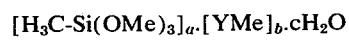

wherein:
each of $a$, $b$ and $c$ is a positive whole number which varies with pH over the range of from pH 1 to pH 8; (in anhydrous form $c = 0$);
each Me is either hydrogen or an alkali metal, e.g. sodium and potassium; the specific nature of Me also varies throughout the stated pH range, being almost exclusively hydrogen at the lower end of the pH scale and being virtually entirely an alkali metal at the upper end of the pH range; and
Y is the anion of either mannuronic acid or salicylic acid.

Neither the absolute nor relative values for $a$, $b$ and $c$ are fixed; the water of hydration varies even as does the ratio of $a:b$ throughout the range from pH 1 to pH 8. The mass (effective molecular weight) of the complex varies from a minimum [$a = b = c = 1$; Me is hydrogen] of about 250 for the salicylate and about 306 for the mannuronate to a maximum of about 5000 for each. All such complexes of the stated formula which are water-soluble within the range of from pH 1 to pH 8 are within the scope of the subject invention and are useful as herein provided.

The complexes are prepared by slowly adding with thorough agitation an aqueous solution of alkali metal methylsilanolate into either salicylic acid, mannuronic acid or an alkali metal salt of one of said acids. While continuing the agitation, the cation exchange resin is added thereto in a quantity sufficient to reduce the pH of the obtained solution to within the range of from 1 to 8. The amount of resin required for this purpose will vary with the resin emloyed, the particular anion Y and the nature of Me for both the acid and the methylsilanolate. Stable aqueous solutions of the complexes are thus obtained within the stated pH range.

The complexes are alternatively obtained by directly dissolving the monomethyltrisilanol in aqueous sodium hydroxide (NaOH) in the presence of the Y anion so that the excess of base is removed through the ion exchange resin to bring the pH to a desired value which is compatible with the stability of the complex.

The subject complexes are useful as active components of therapeutic and cosmetic drugs, either alone or in combination with other active components, in any pharmaceutically acceptable supporting medium. As administration is satisfactorily effected by a variety of routes, e.g. by electrophoresis, intramuscularly, intravenously, orally, rectally, percutaneously and topically (in the form of baths, milks, creams, lotions, collyriums and application pads), all pharmaceutically acceptable carriers which are compatible with water-soluble materials or aqueous solutions are useful as carriers in the administration of these complexes.

Each of the complexes of this invention has a variety of therapeutic applications. In addition to its own therapeutic index it acts as a potentiator of other pharmaceuticals, e.g. antibiotics, such as penicillin and streptomycin, when the latter are employed in their normal manner and for their usual function. The relatively low toxicity of the complexes is an important factor in their combination with other active ingredients with which they are compatible, e.g. other pharmaceuticals in watersoluble form.

The therapeutic efficiency relating to antiviral activity of MSB was determined on experimental infections in mice with influenza virus (P.R. 8), herpes virus and poliomyelitis virus (Lansing strain). MSB exerted a substantially protective effect against these viral infections when administered subcutaneously at a daily dose of 0.10 milliliter (ml) of solution per mouse. The concentration of MSB in employed ampoules was 0.5 percent by weight, representing a dose of active principle of 25 milligrams (mg) per kilogram (kg) of body weight.

Since aqueous MSB solution does not exert any direct antiviral action in in vitro tests, the product may act in vivo through a defense strengthening mechanism. The noted antiviral activity was confirmed by repeating testing. Increasing the noted dose did not lead to any improvement.

Aqueous solutions (0.5 percent by weight MSB) were injected subcutaneously (in association with penicillin G) at a dose of 0.25 ml per mouse in acute experimental infections with penicillin sensitive (TIN strain) and penicillin resistant (BEN strain) staphylococci. A definite strengthening of the therapeutic effect was observed with respect to the infection resulting from the penicillin sensitive strain. A very definite synergistic effect was noted with respect to the infection resulting from the penicillin resistant (the amount of penicillin employed, when used alone, has no effect) strain. [The foregoing is based on three series of test for each strain (a) MSB administered alone, (b) Penicillin G administered alone, and (c) the dose of MSB administered alone and that of Penicillin G administered alone are administered concurrently.]

Monomethyltrisilanol mannuronate, e.g. in the form of its sodium mannuronate is particularly useful in the treatment of wrinkles or cellulitis. For this purpose it is generally administered topically to the affected area in conventional topical compositions, e.g. lotions, creams, milks and foam bath products. In these compositions the concentration of the monomethyltrisilanol mannuronate can vary from about 0.01 percent by weight to about 5 percent by weight or even more, but little advantage is found in employing compositions having a concentration greater than 0.2 per 100g of total composition for topical administration; the preferred concentration is from 0.02 to 0.05 percent by weight. The pH of compositions for topical administration is maintained at at most 7.5, preferably at most 7.0.

The involution process of connective tissue towards the cellulitic state is extremely common, and its pathogeny is still unknown. Mechanical factors are involved in its origin and promote its development. These factors are both endogenic, e.g. obesity, and exogenic, e.g. constrictions, such as corsets, stocking fasteners and shoulder straps. Cellulities is easily caused in the deltoid region and in the thighs.

Thigh cellulitis is usually connected to fatty infiltration, causing the silhouette to have a peculiar aspect like "riding breeches". Obesity, however, is not always present, cellulitis exists with or without obesity.

Dermoline is a cream having Algisium as the active ingredient in an oil emulsion in water. The concentration is from 0.02 to 0.05 g of Algisium per 100g of Dermoline. Dermoline, applied topically once or twice each day for a period of from three to six months, results in material improvement in cases of cellulitis so treated. The treatment is manual, and topical administration is applied directly to the affected area. After a treatment period as short as one month, lessening of oedema and disappearance of pain are observed.

The amount of Dermoline used is about 1 g per 10 sq. cm. of skin.

Following examples concern various cosmetic drug preparations according to the invention.

EXAMPLE A

Preparation of a specific cream, on the basis of mannuronate:

| | |
|---|---|
| Diethyleneglycol stearate | 5 g |
| Spermaceti | 7 g |
| Lanoline | 6 g |
| Isopropyl myristate | 3 g |
| Perhydrosqualene | 6 g |
| Tween 20 | 2 g |
| Sorbitan Monolaurate | 2 g |
| Triethanolamine (at 20%) | 4 g |
| Carboxymethylene | 0.35 g |
| 1% solution of monomethyltrisilanol (mannuronate) | 8 g |
| Preservative agents | sufficient amount |
| Perfume | sufficient amount |
| Distilled water | sufficient amount to 100 g |

The fatty agents and then the preservative agents are melted on water bath at 60°C. Emulsifiers are then added as follows: diethylene glycol stearate, spermaceti, lanolin isopropyl myristate and perhydrosqualene are molten on water-bath. Tween 20 is added and, successively sorbitan monolaurate and triethanolamine (AT 20%).

The mixture is filtered on cloth.

In another vessel the carboxypolymethylene is dissolved in hot water, while strongly agitating. After the dissolution is completed, this mixture is poured under quick agitation into the first mixture of fatty agents and emulsifiers.

After having obtained a homogenous mixture, there is added the solution at 1% of monomethyltrisilanol.

After cooling, the pH value is brought to 6.5 through triethanolamine and flavour or perfume is added.

EXAMPLE B

Preparation of a milk on a basis of mannuronate:

| | | |
|---|---|---|
| Mixed polyoxyethylene glycol stearate | 7 | % |
| Stearic acid | 1 | |
| Vaseline oil | 3 | |
| Glycolic extract of hamamelis and St. John's Bread | 3 | |
| preservative agent | 1 | |
| Flavour | 0.2 | |
| Distilled water | 79.8 | |
| Algisium at 1% | 5 | |

EXAMPLE C

| | |
|---|---|
| 1% solution of monomethyltrisilanol | 15 g |
| SEQUESTRAN | 1 gr |
| Methanolamine of fatty acid of coconut | 22 gr |
| Oleic alcohol | 0.9 g |
| Preservative and flavour polyglycolic sulphate ether of lauric alcohol and sodium | 60 gr |

One dissolves at 60°C with slow agitation the polyglycolic ethersulphate of lauric alcohol and sodium, the Sequestran and the preservatives. One lets cool for 24 hours and then adds the oleic alcohol, the flavour and possibly the dyestuff.

In the text and examples all percentages are by weight and all solutions are aqueous solutions unless otherwise specified. The following terms are full equivalents:

Carboxymethylene-carboxypolymethylene (Merck index page 210);
Carbopol, carboxyvinylpolymer;
Hamamelis (Merck Index page 515), witch hazel; St. John's wrot-
St. John's bread- algaroba- locust gum; Sequestram, tetraacetic ethylenediamine, sodium edetate, sequestrene NA₂, sequestrene NA₃, sequestrene;
Ethyleneglycol monostearate wax — polyethylene glycol stearate, waxy solid having a molecular weight in the range from 1200 to 1500;
Polyglycolic sulphate ether of lauric alcohol and sodium- alcoholic sulphate lauric ether.

Wherever reference is made to preservative agent, any one or combination of the following is employed: methyl parahydroxybenzoate, propyl parahydroxybenzoate, sorbic acid.

Flavor or perfume is entirely optional. Any known flavoring agents or perfumes can be employed or omitted, as desired.

Examples of preparation of the MSB are detailed below:

Preparation of an injectable specific solution for intravenous injections.

| | |
|---|---|
| The composition is: | |
| 1% solution of salicylate of monomethyltrisilanol | 50 cc |
| distilled water | sufficient amount to 100 cc |

A solution of 0.5 % of salicylate of monomethyltrisilanol is thus obtained, which is poured into ampoules and which is sterilized in a autoclave at 120°C for 3/4 hour.

The same amounts of constitutents and preparation are used for the specific compositions either injectable by intramuscular injection or provided for rectal administration.

MSB (see Gendre, *Comptes rendus*, vol. 161, No. 11, p. 2177, 1967; vol. 162, No. 2, p. 412, 1968) is useful as a preventative, palliative and/or curative for atheromatosis, chronic coronary insufficiencies and arteropathies. A 1 percent (by weight) aqueous solution thereof (as monomethyltrisilanol orthohydroxybenzoate of sodium) has been successfully employed with iontophoresis for the treatment of coronary angina pectoris.

The apparatus used for the iontophoresis is the ionotron, conceived and built by J. Breton. This self-regulating apparatus can control its output current precisely, irrespective of variations in skin resistance at the point of contact.

For cardiac ionization an electrode of the CONDUTIX type covered with polyurethane foam is used. Sessions generally last about thirty minutes and are conducted at intervals of 24 hours. The current strength varies between 15 and 25 milliamperes.

All of twenty patients suffering from a severe chronic coronary deficiency (that resisted usual remedies) were considerably improved; in the great majority of the cases the anginal syndrome practically disappeared, while attacks became clearly less frequent, less severe and less intense in the other cases. Improvement is generally apparent between the third and seventh session.

For the treatment of the same conditions MSB is useful in the form of intravenous injections. For this purpose a 0.5 percent (by weight) aqueous solution is employed. The results obtained are similar to those indicated for combined treatment with iontophoresis.

Intravenous injections vary from patient to patient. A safe starting dosage is about 10 cubic centimeters (cc) every other day for a period of two weeks and the same dosage at longer intervals thereafter. At this concentration a dose of 250cc is not toxic for humans.

EXAMPLE 1 — Y is Salicyclic Acid

Add 80 cc of distilled water to 1 g of salicyclic acid in a beaker. Pour 3 cc of an aqueous solution (containing 30 percent by weight of dry extract) of sodium methylsilanolate slowly onto the obtained mixture while agitating the latter vigorously. With continued vigorous agitation progressively add DOWEX 50 cation exchange resin thereto until the pH of the resulting solution is 4.7.

Then filter the resin from the solution, wash the resin and supplement said solution with distilled water to 100 cc. This solution, which remains clear for an extended period and is electrically conductive, yields a precipitate on addition of a strong acid, such as hydrochloric acid, when the pH is reduced to about 1 or on the addition of a base when the pH is about 8.

The complex obtained corresponds to the formula:

$$C_7O_3H_5Na.CH_3—Si(OH)_3$$

and its formula weight is 254.

EXAMPLE 2 — Y is Mannuronic Acid

Add 900 cc of distilled water to 6.256 g of D-mannuronic acid in a beaker to form an aqueous solution. To this solution add slowly, with thorough agitation, 10 g of an aqueous solution (containing 30 percent by weight of dry extract) of sodium methylsilanolate. Progressively add to the resultant (with continued vigorous agitation) DOWEX 50 cation exchange resin until the pH of the solution is 6. Then filter the resin from the solution, wash the resin and supplement the solution with distilled water to a total volume of 1000 cc.

The solution thus formed is that of a complex of the formula $$C_6H_9O_7Na \cdot CH_3-Si(OH)_3$$

having a formula (molecular) weight of 310.

In this particular example D-mannuronic acid is employed. Corresponding products are similarly obtained with either L-mannuronic acid or DL-mannuronic acid. All three products are useful in the same manner.

What is claimed is:

1. A therapeutically-acceptable aqueous composition containing from 0.01 to at most 5 percent by weight of monomethyltrisilanol mannuronate complex of the formula $$[H_3C-Si(OMe)_3]_a \cdot [YMe]_b \cdot cH_2O$$

wherein each of a and b is a positive whole number,
  c is 0 or a positive whole number,
  each Me is either hydrogen or an alkali metal, and
  Y is the anion of mannuronic acid,
capable of forming a stable aqueous solution over virtually the entire range between pH 1 and pH 8.

2. A topically-applicable oil-emulsion-in-water cream composition according to claim 1.

3. A therapeutically acceptable aqueous composition according to claim 1 wherein the complex is an alkali metal monomethyltrisilanol complex.

4. A topically-acceptable cosmetic drug composition consisting essentially of a stable aqueous solution of monomethyltrisilanol mannuronate complex of the formula $$[H_3C-Si(OMe)_3]_a \cdot [YMe]_b \cdot cH_2O$$

wherein each of a and b is a positive whole number,
  c is 0 or a positive whole number,
  each Me is either hydrogen or an alkali metal, and
  Y is the anion of mannuronic acid,
having a pH from 1 to 8, any vehicle in the composition being compatible with the aqueous solution, and the concentration of monomethyltrisilanol mannuronate in the composition being sufficient for effective topical treatment of cellulitis.

5. A method of treating cellulitis which comprises topically applying to affected areas a composition according to claim 1.

* * * * *